July 8, 1924.
T. W. SOUTHARD
POULTRY FEED TROUGH
Filed April 12, 1922
1,500,343
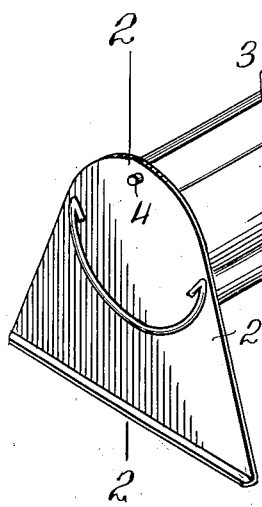
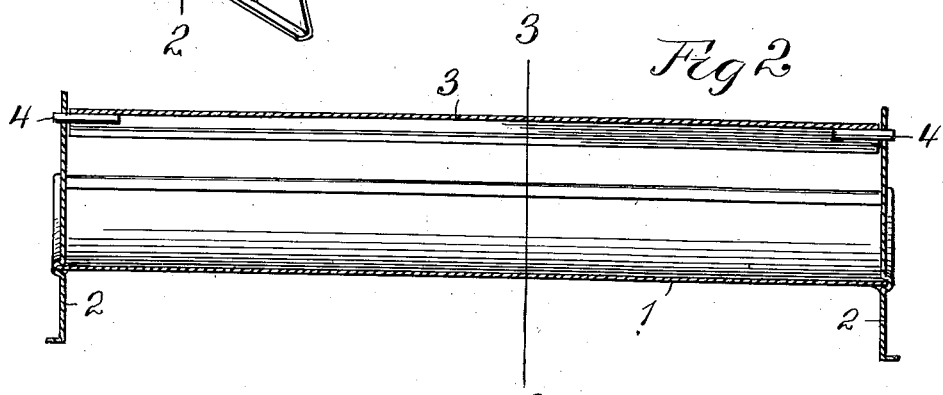
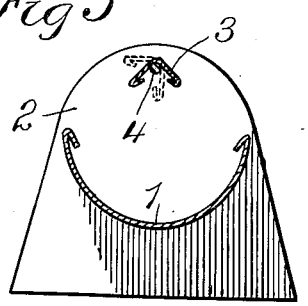
Witness:
R. E. Hamilton
INVENTOR.
Thomas W. Southard
BY
Warren D. House
His ATTORNEY.

Patented July 8, 1924.

1,500,343

UNITED STATES PATENT OFFICE.

THOMAS W. SOUTHARD, OF KANSAS CITY, MISSOURI.

POULTRY FEED TROUGH.

Application filed April 12, 1922. Serial No. 551,785.

*To all whom it may concern:*

Be it known that I, THOMAS W. SOUTH-ARD, a citizen of the United States, residing at Kansas City, in the county of Jackson and State of Missouri, have invented a certain new and useful Improvement in Poultry Feed Troughs, of which the following is a specification.

My invention relates to improvements in feed troughs.

It is particularly well adapted for use on poultry feed troughs.

One of the objects of my invention is to provide a feed trough of the kind described with a novel guard which is simple, cheap to make, durable, not liable to get out of order, and which will prevent the birds from getting into the trough.

A further object of my invention is to provide a novel feed trough guard which, in addition to keeping fowls out of the trough will afford an unstable support to a fowl attempting to perch thereon.

The novel features of my invention are hereinafter fully described and claimed.

In the accompanying drawing, which illustrates the preferred embodiment of my invention, Fig. 1 is a perspective view of my improved feed trough.

Fig. 2 is a longitudinal vertical sectional view of the same on the line 2—2 of Fig. 1.

Fig. 3 is a cross section on the line 3—3 of Fig. 2.

Similar reference characters designate similar parts in the different views.

1 designates the channel portion of a feed trough disposed intermediate of and having its ends respectively secured to two vertical end members 2.

Disposed above and spaced apart from the channel portion 1 is a guard 3 having its ends respectively pivoted, preferably eccentrically to the end members 2.

The guard 3 is preferably other than circular in cross section, and in the preferred form it is of V shape, as shown.

The longitudinal V shaped guard 3 has at its respective ends two trunnions comprising pieces of wire 4 disposed substantially at the apex of the guard and secured to the guard in the angle thereof and respectively pivoted in the end members 2.

By having the guard of the shape described and pivotally mounted in the end members 2, it affords in a single member an unstable footing for a fowl that tries to perch on the guard, and after the fowl is dislodged, the guard will swing by gravity to its original position.

I do not limit my invention to the structure shown and described, as many modifications, within the scope of the appended claim, may be made without departing from the spirit of my invention.

What I claim is:—

A feed trough of the kind described having two ends and an intermediate channel portion, and a longitudinal V-shaped guard member above and spaced apart from said channel portion and provided at its respective ends with trunnions disposed substantially at the apex of the guard and respectively pivoted in the ends of the trough, substantially as set forth.

In testimony whereof I have signed my name to this specification.

THOMAS W. SOUTHARD.